United States Patent [19]
Wallis

[11] Patent Number: 5,197,718
[45] Date of Patent: Mar. 30, 1993

[54] SELF-CONTAINED GAS SPRINGS INTERCHANGEABLE WITH COIL SPRINGS

[76] Inventor: Bernard J. Wallis, 2215 Dacosta, Dearborn, Mich. 48128

[21] Appl. No.: 627,699

[22] Filed: Dec. 14, 1990

[51] Int. Cl.$^5$ .............................. F16F 9/02; F16F 9/34
[52] U.S. Cl. ................................... 267/119; 267/130; 267/64.28; 267/124; 267/64.11; 137/68.1
[58] Field of Search .......... 267/119, 130, 64.11–64.28, 267/75, 121, 124, 118, 34, 124–129; 137/68.1, 71, 70; 92/134, 117, 128, 165 R, 168, 21 MR, 15, 17; 188/376, 371, 322.17, 322.21, 321.11; 72/453.13

[56] References Cited

U.S. PATENT DOCUMENTS

| | | | |
|---|---|---|---|
| 2,047,750 | 7/1936 | Smith | 137/71 |
| 2,603,477 | 7/1952 | Carter | 267/119 |
| 2,833,379 | 5/1958 | Matthews et al. | 267/64.11 X |
| 2,857,157 | 10/1958 | Bonquet | 267/127 |
| 3,101,194 | 8/1963 | Hennells | 267/119 |
| 3,338,136 | 8/1967 | Jerome et al. | 92/168 X |
| 3,428,303 | 2/1969 | Lynch | 267/124 X |
| 3,447,795 | 6/1969 | Vickers | 267/119 |
| 3,631,767 | 1/1972 | Meier | 92/165 R |
| 3,665,816 | 5/1972 | Caudle | 92/168 |
| 3,677,041 | 7/1972 | DeKoupil | 267/130 X |
| 3,693,644 | 9/1972 | Dilorenzo | 137/71 |
| 3,759,146 | 9/1973 | Brotherton | 92/168 X |
| 3,777,627 | 12/1973 | Goade | 92/168 |
| 3,799,530 | 3/1974 | Stembridge | 267/130 |
| 3,947,005 | 3/1976 | Wallis | 267/119 |
| 4,005,763 | 2/1977 | Wallis | 267/119 X |
| 4,076,103 | 2/1978 | Wallis | 267/119 X |
| 4,085,661 | 4/1978 | Schriever | 92/128 X |
| 4,126,184 | 11/1978 | Hirrichs | 137/68.1 X |
| 4,154,434 | 5/1979 | Wallis | 267/130 X |
| 4,167,134 | 9/1979 | Yuda | 92/128 X |
| 4,211,151 | 7/1980 | Wallischeck | 92/165 R |
| 4,219,040 | 8/1980 | Fallon et al. | 137/68.1 |
| 4,447,047 | 5/1984 | Newell | 92/168 X |
| 4,512,491 | 4/1985 | DeGood et al. | 137/68.1 |
| 4,528,838 | 7/1985 | Wallis . | |
| 4,529,181 | 7/1985 | Wallis . | |
| 4,549,565 | 10/1985 | Short, III | 137/71 |
| 4,550,899 | 11/1985 | Holley | 267/64.28 X |
| 4,553,559 | 11/1985 | Short, III | 137/68.1 |
| 4,572,489 | 2/1986 | Wallis . | |
| 4,583,722 | 4/1986 | Wallis | 267/119 |
| 4,585,215 | 4/1986 | Kramer | 267/124 |
| 4,594,938 | 6/1986 | Shore | 92/168 X |
| 4,628,796 | 12/1988 | Wallis . | |
| 4,664,362 | 5/1987 | Hennells | 267/119 |
| 4,741,518 | 5/1988 | Wallis | 267/119 X |
| 4,742,997 | 5/1988 | Wallis | 267/119 |
| 4,765,227 | 8/1988 | Balazs et al. | 72/453.13 X |
| 4,774,865 | 10/1988 | Wallis | 267/119 X |
| 4,792,128 | 12/1988 | Holley | 267/64.28 X |
| 4,813,655 | 3/1989 | Hennells | 267/64.28 |
| 4,838,527 | 6/1989 | Holley | 267/130 X |
| 4,844,429 | 7/1989 | Ecktman | 267/119 X |
| 4,934,230 | 6/1990 | Wallis | 72/453.13 X |
| 5,050,630 | 9/1991 | Farwell et al. | 137/68.1 |

FOREIGN PATENT DOCUMENTS 2188698  10/1987  United Kingdom ............. 267/64.28

*Primary Examiner*—Douglas C. Butler
*Attorney, Agent, or Firm*—Barnes, Kisselle, Raisch, Choate, Whittemore & Hulbert

[57] ABSTRACT

A self contained gas spring which is interchangeable with a coil spring that is constructed such that it is not adversely affected by the deleterious effects of oil and other contaminants. The gas spring comprises a one-piece cylindrical upper body having a base wall and a peripheral wall and a rod extending upwardly into the cylindrical body such that the upper body completely encircles and encloses the upper end of the rod. The rod has a base and the outer diameter of the peripheral wall of the cylinder and the outer diameter of the base have substantially the same diameter such that the cylinder can be positioned in a recess of a press or die in place of a coil spring. The cylindrical body and rod include interengaging portions limiting axially outwardly movement of the cylinder relative to the rod. The cylinder further includes a charging valve in the base of the rod through which gas may be introduced for charging the space between the cylinder and the rod and a pressure relief rupture disk in the base wall of the cylindrical body.

13 Claims, 5 Drawing Sheets

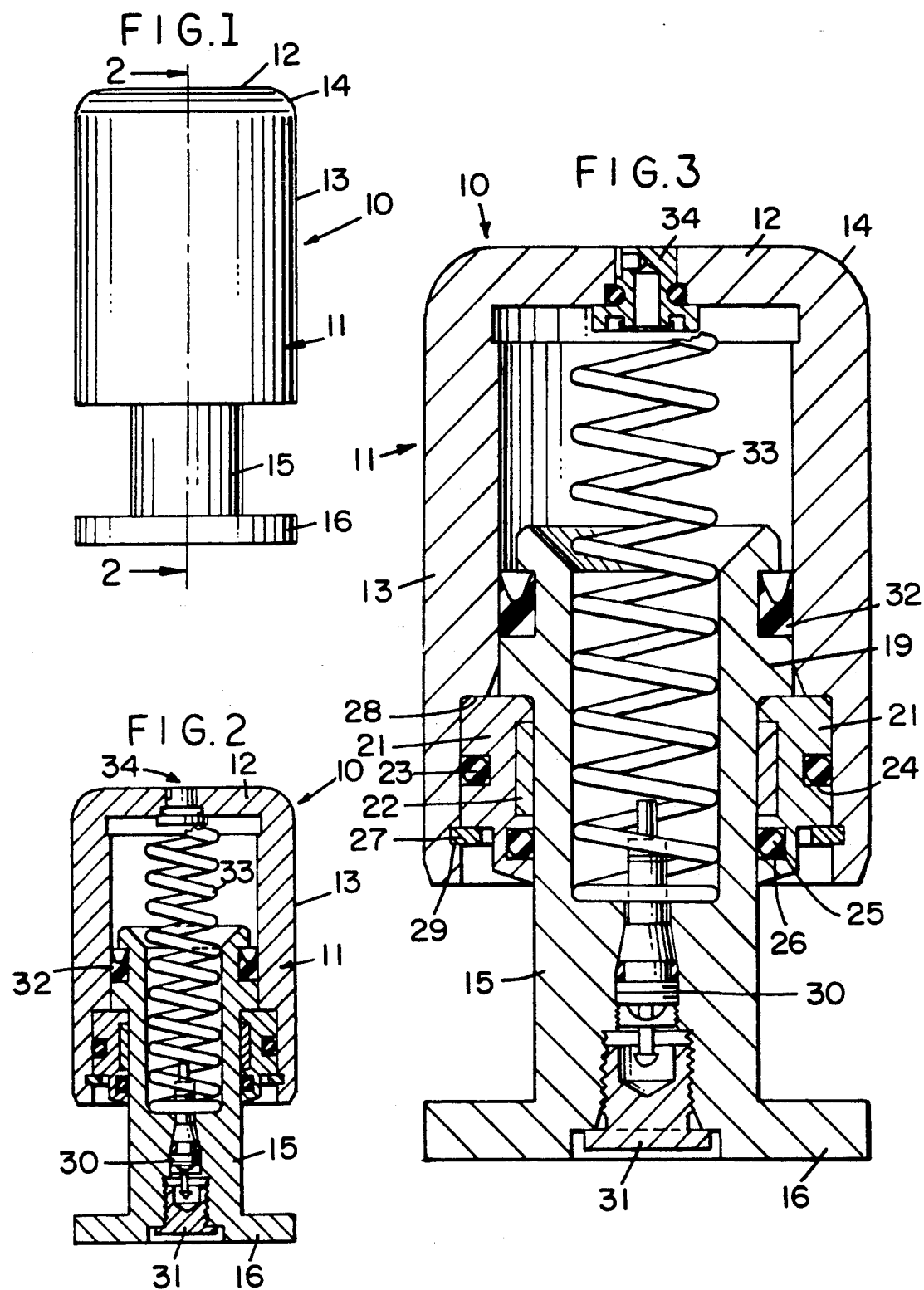

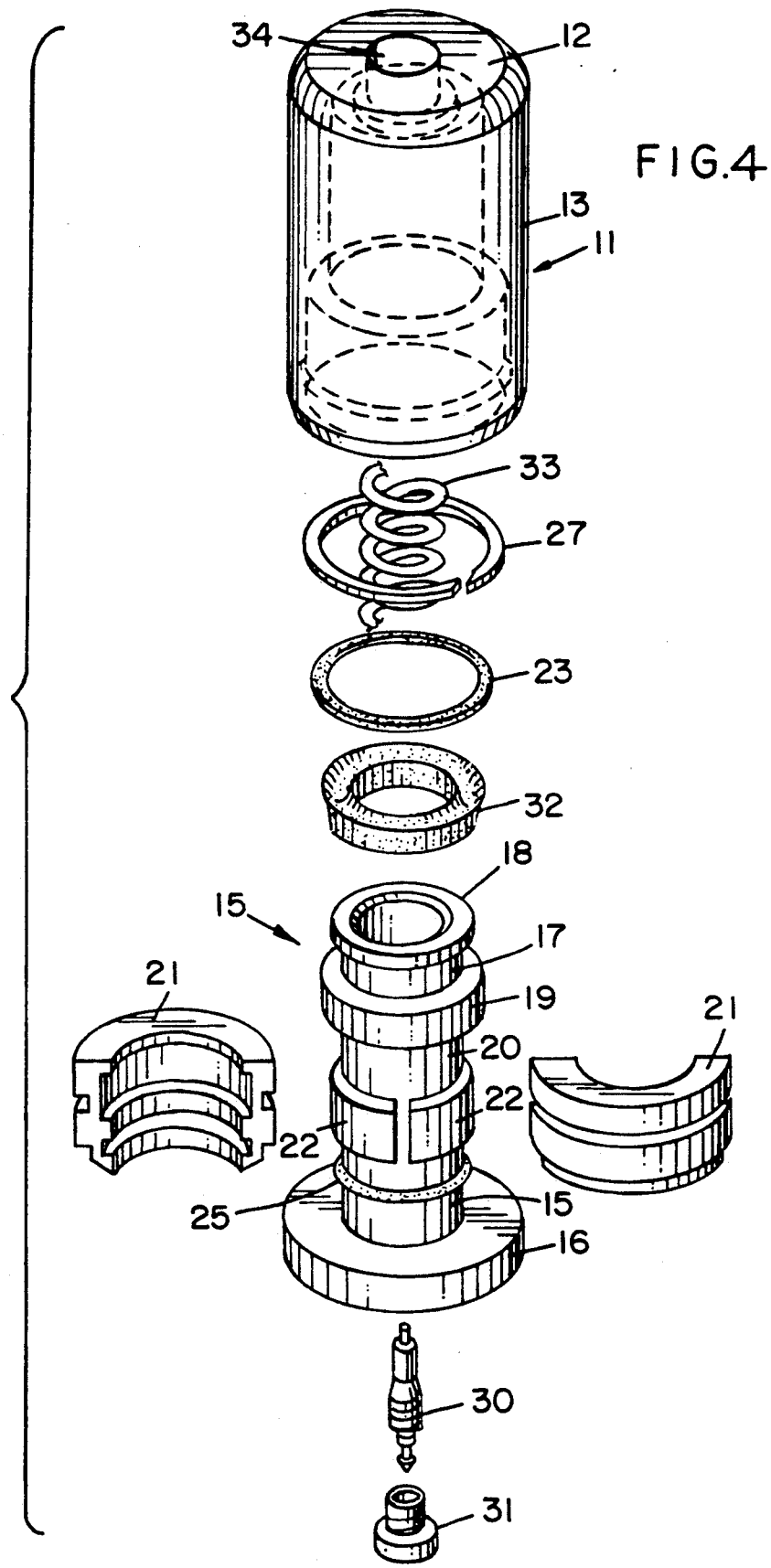

SELF-CONTAINED GAS SPRINGS INTERCHANGEABLE WITH COIL SPRINGS

BACKGROUND AND SUMMARY OF THE INVENTION

In presses and dies it has been common to utilize metal coil springs that fit in cylindrical pockets in a die in order to absorb the force of various operations such as metal stamping operations. It has also been common to design tooling such that they incorporate gas springs which are either associated with a manifold or self contained. In a manifold type, a plurality of gas springs are mounted in a manifold or connected to a line and gas from the manifold or line is maintained on each gas spring, as shown, for example, in U. S. Pat. Nos. 4,523,838, 4,529,181, 4,572,489, 4,583,722 4,628,796 and 4,742,997. In self contained type, each gas spring is charged with gas as shown, for example, in U. S. Pat. No. 4,741,518.

When coil springs are utilized in tooling, a large number of such coil springs are required. Furthermore, they tend to fatigue and break in which case the fragments can damage the tooling. Casings have been used about each coil spring to minimize such damage. It has hereto been proposed that a self contained gas spring be interchangeable with a metal coil spring as shown in U. S. Pat. No. 4,741,518.

As set forth in U. S. Pat. No. 4,741,518, a self contained gas spring interchangeable with a coil spring comprises a cylindrical body having a constant diameter external cylindrical surface, the cylindrical body having open ends and a piston within said cylindrical body and having one end projecting through one of the openings of the cylindrical body. The piston and the cylindrical body have interengaging flanges that limit the outward movement of the piston relative to the cylindrical body. A plug is positioned in the other end of the cylindrical body to close the opening of the cylindrical body. A charging valve is positioned in the plug for charging the interior of the gas spring. The piston has a hollow inner end with an inner surface tapering outwardly and axially toward the plug. The plug has a generally complementary surface such that the piston can move downwardly about a portion of the plug thereby substantially reducing the height of the gas spring. Such a gas spring is effective for the intended purpose. However, it is likely to be subjected to contamination by oil or other external contaminants passing downwardly along the piston.

Among the objectives of the present invention are to provide a small gas spring which is interchangeable with a coil spring; which can be readily substituted for a coil spring without any change in the tooling; which is compact and effective for the intended purpose; which obviates the deleterious effects of oil or other contaminants from the exterior of the press or die; which can be readily assembled; which will be retained in position in case of dissipation or loss of gas pressure without risk of damage to the tooling; which does not require any separate casing as is used in coil springs; and which can be provided in various sizes to produce the desired forces so that the gas spring can replace a plurality of coil springs.

In accordance with the invention, the self contained gas spring that is constructed such that it is not adversely affected by the deleterious effects of oil and other contaminants. The gas spring comprises a one-piece cylindrical body having an imperforate base wall and a peripheral wall and a rod extending upwardly into the cylinder such that the upper cylindrical body completely encircles and encloses the upper end of the rod and has a base portion wherein the outer diameter of the peripheral wall of the cylinder and the outer diameter of the base have substantially the same diameter such that the cylinder can be positioned in a recess of a press or die in place of a coil spring. The cylindrical body and rod include interengaging portions limiting axially outwardly movement of the cylinder relative to the rod. The cylinder further includes a charging valve in the base of the rod through which gas may be introduced for charging the space between the cylinder and the rod and a pressure relief rupture disk in the base wall of the cylindrical body.

DESCRIPTION OF THE DRAWINGS

FIG. 1 is a elevational view in actual size of a gas spring embodying the invention.

FIG. 2 is a vertical sectional view of the gas spring shown in FIG. 1 taken along the line 2—2 in FIG. 1.

FIG. 3 is a sectional view similar to FIG. 2 on an greatly enlarged scale.

FIG. 4 is a exploded view of a gas spring embodying the invention.

DESCRIPTION

Figure 5:
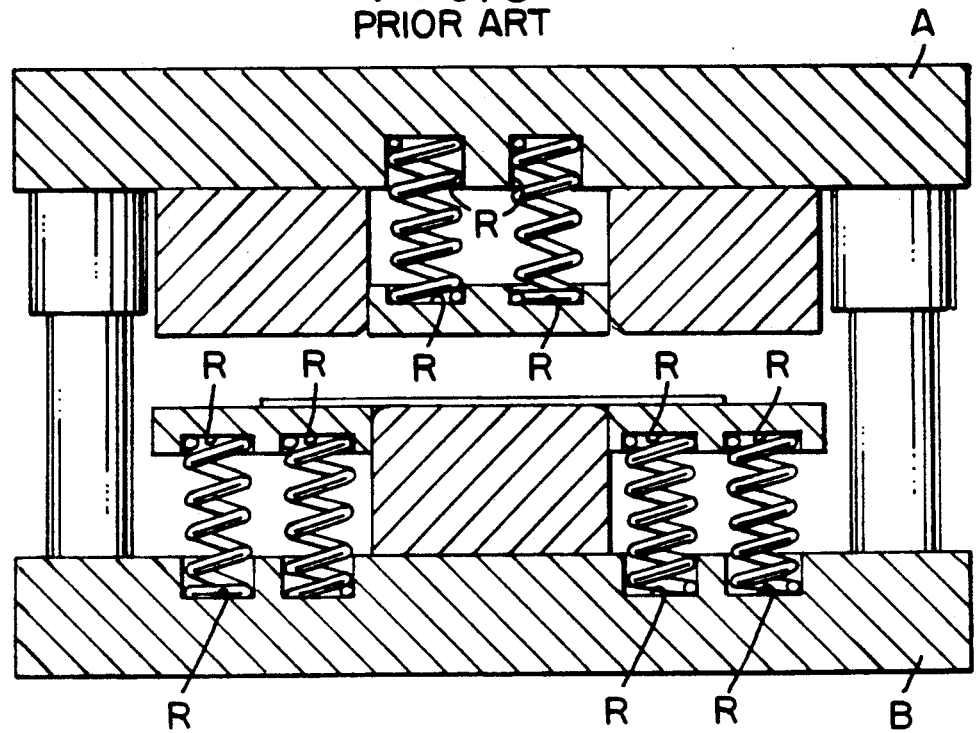
FIG. 5 is a vertical sectional view of a portion of a stamping press utilizing coil springs in accordance with the prior art.
Figure 6:
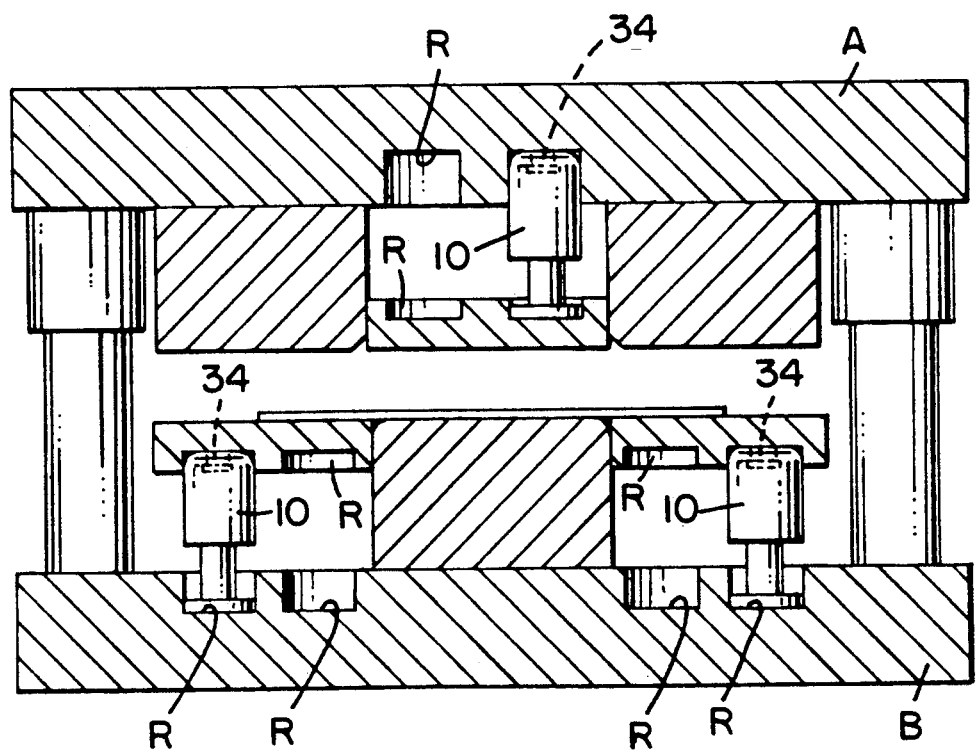
FIG. 6 is a sectional view of a portion of a press showing the use of gas springs embodying the invention utilized in place of the coil springs.

Referring to FIGS. 5 and 6, the gas springs 10 embodying the invention are adapted to be interchangeable with coil springs 11 that fit into pockets in the portion of the die R or the like of a press such as it is used in metal stamping.

Referring to FIG. 1, a gas spring 10 embodying the invention comprises a cylinder 11 which is made of metal in one piece and has a base wall 12 and a peripheral wall 13 connected by an outer rounded portion 14. A rod 15 extends upwardly into the cylindrical body 11 such that the upper body completely encircles and encloses the upper end of the rod and has a base 16 having an exterior diameter substantially equal to the exterior diameter of the cylindrical wall 13 of the cylinder such that one or more of the gas springs 10 can be positioned in the recesses of a tooling as shown in FIG. 6 in place of the coil springs (FIG. 5). The diameter of the base 16 is substantially the same as the diameter of the coil spring which it is to replace such that it substantially fills the recess R.

Referring to FIGS. 2, 3, and 4, the rod 15 includes a groove 17 at its upper end formed by a radial flange 18 at the free end and a spaced integral annular portion 19. The remainder of the rod 15 below the flange 19 has a constant diameter as at 20 extending to the base 16. An annular lip seal 32 is positioned in the groove 17. The annular flange 19 cooperates with a stop 21 on the cylinder to limit the axially outward movement of the cylinder 11 under the action of pressure when the gas spring is pressurized The stop 21 comprises a separate member and is preferably in the form of two split portions 21 (FIG. 4) that surround the rod 15 and enclose split wear pads 22. An O-ring retainer 23 is provided in a recess 24 in the split portions 21 of the stop 21. An O-ring 25 is provided in a recess 26 on the interior of the split portions of stop 21. A split spring retainer 27 in a recess 29 in wall 13 maintains the stop 21 in position within the enlarged lower portion 28 on the inner surface of the wall 13.

Figure 7:
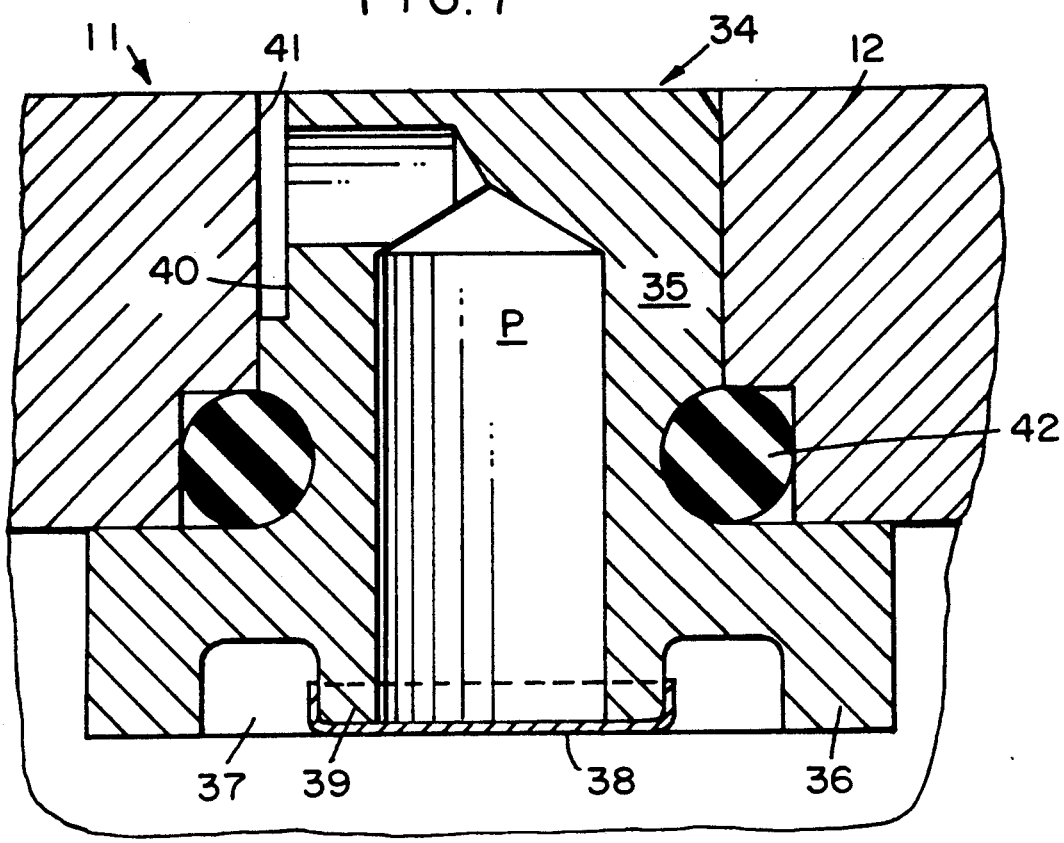
FIG. 7 is a sectional view on a greatly enlarged scale of the portion of the gas spring having a rupture disk assembly mounted therein.
Figure 8:
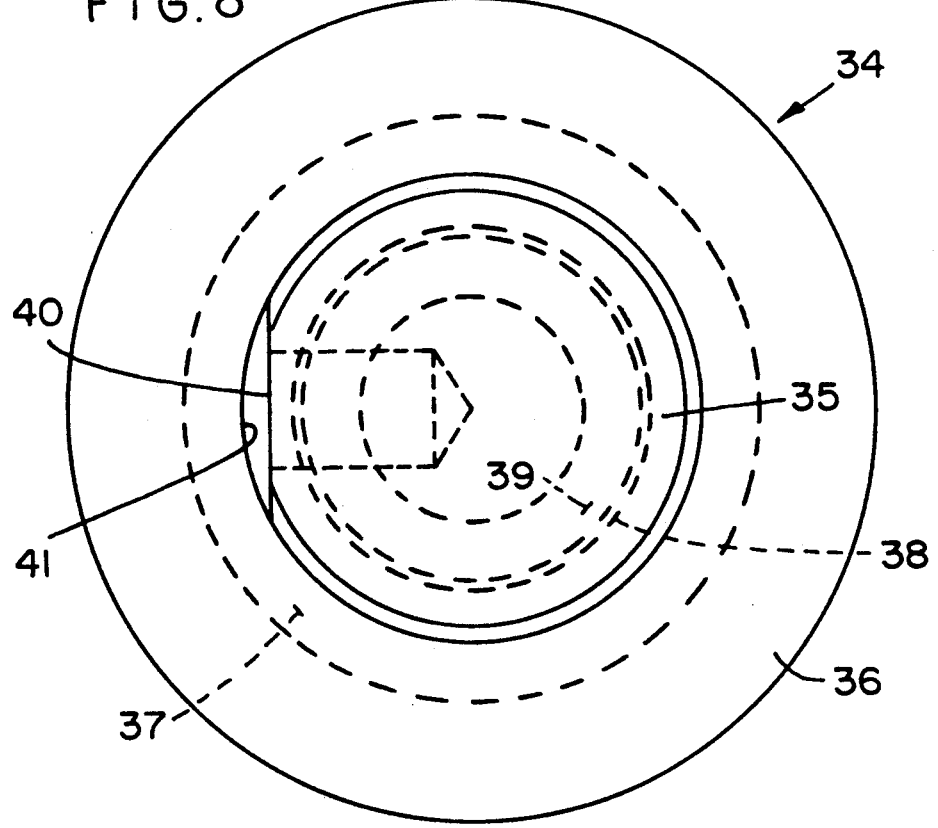
FIG. 8 is a plan view of the portion of the gas spring shown in FIG. 7.

A charging valve 30 is threaded into the lower end of the rod and is accessible after removal of the threaded plug 31 in the base of the rod 15. A spring 33 is interposed between the under surface of the base wall 12 and the base of an axial recess in the rod 15 to provide a yielding force urging the cylinder body 11 outwardly when there is no gas charges. A pressure relief rupture disk assembly 34 is provided by press fit in the base wall 12 of the cylindrical body and functions to relieve excessive pressure which may occur. As shown in FIGS. 7 and 8, the rupture disk assembly comprises a body 35 that is press fitted in an opening from the interior of the cylindrical body 11. The body 35 includes a flange 36 that engages the inner surface of the base wall 12. The flange 36 includes an annular groove 37 which defines a tubular extension 39 over which a metal rupture disk 39 is positioned. The disk 38 includes a peripheral skirt extending about the outer surface of the tubular extension 39 and soldered thereto. The groove 37 facilitates mounting of the disk and the soldering thereof as the converted body 35 is inserted or moved. An O-ring 42 in a recess in the body 35 facilitates a gas tight seal. Upon rupture of the disk 38, gas is vented through a passage P. The body 35 has a passage defined by opening 41 in the base wall and a flattened portion 40 on the upper end of the body.

In order to assemble the cylinder, the seal 32 is first placed in the groove 17 on the rod 15. The lower wear pads 22 are assembled in the split portions of the stop 21 and then the O-ring retainer ring 23 is provided over the split portions of the stop 21. The rod 15 is inserted in the cylinder body where the split portions in assembled position thereon and the split retainer 27 is finally provided in the groove 29 to retain the spring in a assembled position.

In use, the gas springs are pressurized and positioned in place of coil spring in some of the recesses R of the press. Inasmuch as the gas spring provides substantially more force than a typical coil spring, one gas spring can be utilized in place of a plurality of coil springs.

Figure 9:
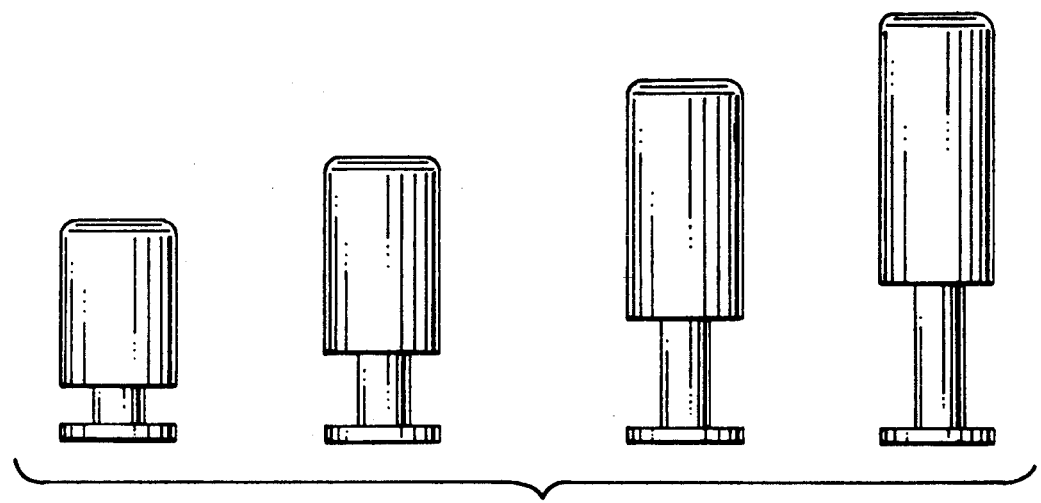
FIGS. 9 and 10 are views showing a plurality of sizes of gas springs embodying the invention.
Figure 10:
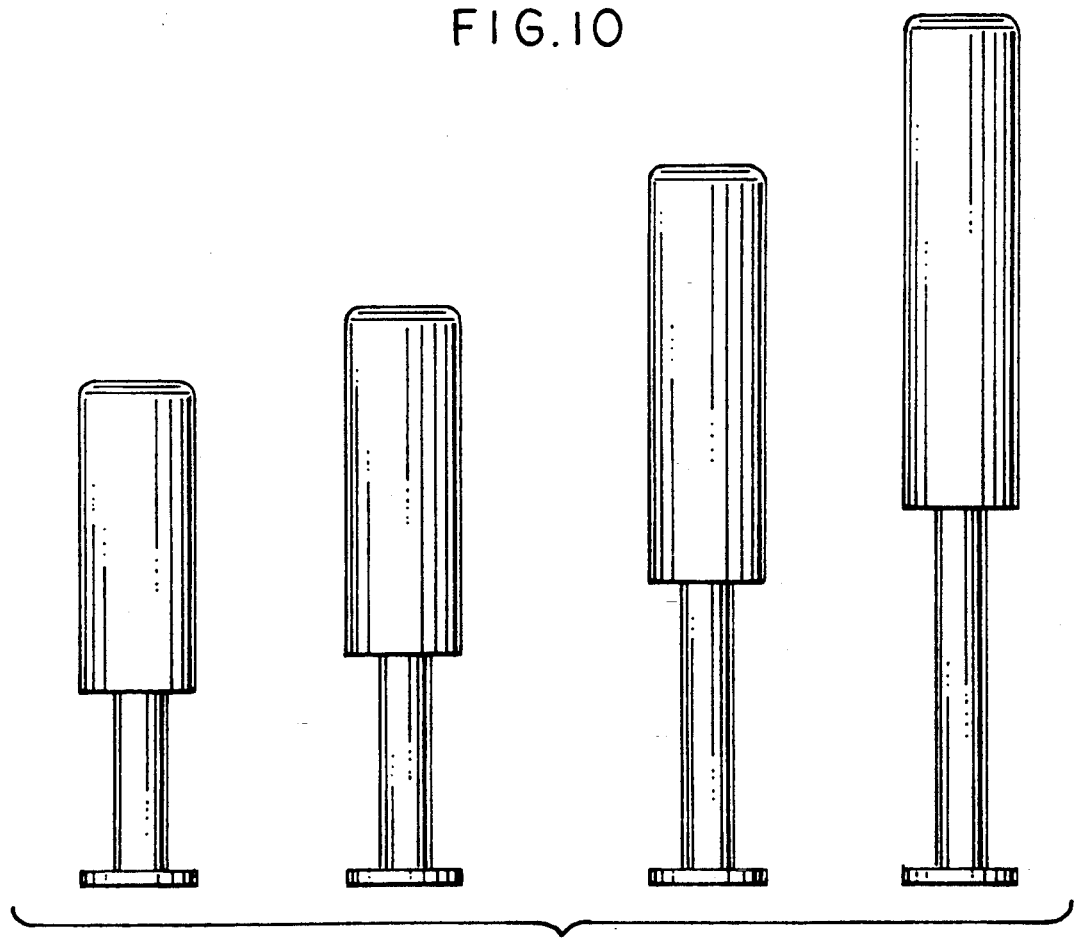

Referring to FIGS 9-10, it can be readily seen that the gas springs can be provided in various sizes. Inasmuch as the outer diameter of the cylinder is substantially equal to the outer diameter of the base, the gas spring occupies the same space and when placed in the lower portion of the press or die, contaminates will not interfere with the functioning of the gas spring.

Since the cylindrical body 11 completely encloses the upper end of the rod, the gas spring is not adversely affected by oil or other contaminants. The provision of the base 16 insures that the gas spring is retained in position in the enlarged recess which is normally provided for a coil spring. The provision of the spring 33 insures that the gas spring remains in position even if the gas is dissipated by leakage or by rupturing of the disk due to excessive pressure.

It can thus be seen that there has been provided a small gas spring which is interchangeable with a coil spring; which can be readily substituted for a coil spring without any change in the tooling; which is compact and effective for the intended purpose; which obviates the deleterious effects of oil or other contaminants from the exterior of the press or die; which can be readily assembled; which will be retained in position in case of dissipation or loss of gas pressure without risk of damage to the tooling; which does not require any separate casing as is used in coil springs; and which can be provided in various sizes to produce the desired forces so that the gas spring can replace a plurality of coil springs.

I claim

1. A self contained gas spring comprising
   a one-piece upper cylindrical body having a base wall and a peripheral wall having an outer diameter, said peripheral wall having an inside surface,
   a rod extending upwardly into the cylindrical body,
   said rod having an upper end within said body and a lower end exteriorly of said body and having an integral enlarged base having an outer diameter such that the upper body completely encircles and encloses the upper end of the rod,
   said base of said rod having a flat bottom surface of engaging a flat surface of the apparatus in which it is used for transferring forces therebetween,
   the outer diameter of the peripheral wall of said cylindrical body and the outer diameter of the base having substantially the same diameter,
   said cylindrical body and said rod including interengaging means limiting axially outwardly movement of said cylindrical body relative to said rod,
   said cylindrical body further including a charging valve through which gas may be introduced for charging the space between the cylinder and the rod.

2. The self contained gas spring set forth in claim 1 including spring means interposed between said cylindrical body and said rod and yieldingly urging said cylindrical body and said rod axially outwardly relative to one another.

3. The self contained gas spring set forth in claim 2 wherein said interengaging means comprises a flange extending outwardly from said rod and a split stop positioned in a recess on the inside surface of said peripheral wall of said cylindrical body.

4. The self contained gas spring set forth in claim 3 including a retainer for holding said split stop in position in said cylindrical body.

5. The self contained gas spring set forth in claim 4 including a split wear pad mounted in said split stop and engaging said rod.

6. The self contained gas spring set forth in claim 5 including a resilient annular retainer maintaining said split stop on said rod to facilitate assembly of said rod in said cylindrical body.

7. The self contained gas spring set forth in claim 6 wherein said rod has an annular groove, a lip seal positioned in said groove in said rod above said flange and engaging the inside surface of said peripheral wall of said cylindrical body.

8. The self contained gas spring set forth in claim 1 wherein said base wall of said cylindrical wall has an opening therein, a rupture disk assembly positioned in said opening in the base wall of the cylindrical body.

9. The self contained gas spring set forth in claim 8 wherein said rupture disk assembly comprises a rupture disk body press fitted in said base wall, said rupture disk body having a passage therethrough, said rupture disk body having a radial flange engaging the inner surface of said base wall, said radial flange having a groove defining a tubular portion extending inwardly of said cylindrical body of said gas spring, a rupture disk having a peripheral skirt extending into said groove and sealed to said peripheral skirt.

10. The self contained gas spring set forth in claim 9 wherein said rupture disk body has an outer end which includes a flat surface and cooperates with said opening in the base wall to define another passage that communicates with the passage in the body of the disk assembly.

11. A self contained gas spring comprising a one-piece upper cylindrical body having a base wall and a peripheral wall having an outer diameter, said peripheral wall having an inside surface, a rod extending upwardly into the cylindrical body, said rod having an upper end within said body and a lower end exteriorly of said body and having an integral enlarged base having an outer diameter such that the upper body completely encircles and encloses the upper end of the rod, said base of said rod having a flat bottom surface of engaging a flat surface of the apparatus in which it is used for transferring forces therebetween, the outer diameter of the peripheral wall of said cylindrical body and the outer diameter of the base having substantially the same diameter, said cylindrical body and said rod including interengaging means limiting axially outwardly movement of said cylindrical body relative to said rod, said cylindrical body further including a charging valve through which gas may be introduced for charging the space between the cylinder and the rod, spring means interposed between said cylindrical body and said rod and yieldingly urging said cylindrical body and said rod axially outwardly relative to one another, said interengaging means comprising a flange extending outwardly from said rod and a split stop positioned in a recess on the inside surface of said peripheral wall of said cylindrical body, a retainer for holding said split stop in position in said cylindrical body, a split wear pad mounted in said split stop and engaging said rod, a resilient annular retainer maintaining said split stop on said rod to facilitate assembly of said rod in said cylindrical body, said rod having an annular groove, a lip seal positioned in said groove in said rod above said flange and engaging the inside surface of said wall of said cylindrical body, and a rupture disk assembly in the base wall of the cylindrical body.

12. The self contained gas spring set forth in claim 11 wherein said rupture disk assembly comprises a rupture disk body press fitted in said base wall, said rupture disk body having a passage therethrough, said rupture disk body having a radial flange engaging the inner surface of said base wall, said radial flange having a groove defining a tubular portion extending inwardly of said cylindrical body of said gas spring, a rupture disk having a peripheral skirt extending into said groove and sealed to said peripheral skirt.

13. The self contained gas spring set forth in claim 12 wherein said rupture disk body has another end which includes a flat surface which cooperates with the opening in the base wall to define another passage that communicates with the passage in the body of the disk assembly.

* * * * *